United States Patent
Minakuti et al.

(10) Patent No.: US 7,148,928 B2
(45) Date of Patent: Dec. 12, 2006

(54) CAMERA BODY AND INTERCHANGEABLE LENS OF A DIGITAL CAMERA WITH IMAGE-DEPENDENT COLOR COMPENSATION

(75) Inventors: Jun Minakuti, Sakai (JP); Hiroshi Ueda, Habikino (JP); Motoshi Yamaguchi, Sakai (JP); Masahito Niikawa, Sakai (JP)

(73) Assignee: Minolta Co., Ltd., Osaka (JP)

( * ) Notice: Subject to any disclaimer, the term of this patent is extended or adjusted under 35 U.S.C. 154(b) by 682 days.

(21) Appl. No.: 10/234,911

(22) Filed: Sep. 4, 2002

(65) Prior Publication Data

US 2003/0048374 A1 Mar. 13, 2003

(30) Foreign Application Priority Data

Sep. 5, 2001 (JP) ............................. 2001-268565

(51) Int. Cl.
*H04N 5/225* (2006.01)
(52) U.S. Cl. .................................. 348/360; 348/231.3
(58) Field of Classification Search .................. 348/360
See application file for complete search history.

(56) References Cited

U.S. PATENT DOCUMENTS

| 4,851,897 A | * | 7/1989 | Inuma et al. | ............ 348/224.1 |
| 4,855,814 A | * | 8/1989 | Shiraishi et al. | ......... 348/224.1 |
| 5,057,927 A | * | 10/1991 | Hieda | ......................... 348/363 |
| 5,087,978 A | * | 2/1992 | Hieda | ......................... 348/363 |
| 6,184,925 B1 | * | 2/2001 | Abe et al. | ................. 348/223.1 |
| 6,476,869 B1 | * | 11/2002 | Sekine et al. | ............... 348/335 |
| 2003/0179279 A1 | * | 9/2003 | Uemura | ...................... 347/235 |

FOREIGN PATENT DOCUMENTS

JP 2000-244930 A 9/2000

* cited by examiner

*Primary Examiner*—Tuan Ho
(74) *Attorney, Agent, or Firm*—Sidley Austin LLP

(57) ABSTRACT

In a digital camera 1, an interchangeable lens 3 is attachable to a camera body 2, and a lens ROM 30 is provided in the interchangeable lens 3. In the lens ROM 30, an ICC profile which is color compensate information particular to the interchangeable lens 3 is recorded. When photographing is performed with the interchangeable lens 3 attached, the ICC profile is associated with the obtained image data. Consequently, color compensate information can be set for each kind of interchangeable lens, so that color compensation reflecting the characteristic of the interchangeable lens can be appropriately performed on the image data.

7 Claims, 10 Drawing Sheets

CAMERA BODY AND INTERCHANGEABLE LENS OF A DIGITAL CAMERA WITH IMAGE-DEPENDENT COLOR COMPENSATION

This application is based on application No. 2001-268565 filed in Japan the content of which is hereby incorporated by reference.

BACKGROUND OF THE INVENTION

1. Field of the Invention

The present invention relates to a technology of a digital camera having an interchangeable lens and a camera body to which the interchangeable lens is attachable.

2. Description of the Related Art

A method for improving the color reproducibility, on a monitor, a printer and the like, of image data obtained by a digital camera uses color compensate information.

For example, in a lens-interchangeable single lens reflex digital camera, color compensate information determined for each kind of interchangeable lens is stored in the camera body, and the color reproduction characteristic that varies among interchangeable lenses is compensated for by selecting the color compensate information corresponding to the kind of the interchangeable lens attached to the camera body.

In this camera, however, since the color compensate information stored in the camera body is used, in a case where a new interchangeable lens is provided after the camera body is provided, the color compensate information of the new interchangeable lens cannot be obtained from the camera body, so that color compensation reflecting the characteristic of the interchangeable lens cannot be performed.

Moreover, there are various kinds of interchangeable lenses and some of telephoto lenses and wide angle lenses incorporate a filter. In that case, although it is necessary to consider the characteristic of the filter when color compensation of image data is performed, since the above-described camera has no color compensate information on the filter characteristic, an interchangeable lens having a built-in filter cannot be used when accurate color compensation is required.

SUMMARY OF THE INVENTION

The present invention is made in view of the above-mentioned problem, and an object thereof is to obtain a technology of a digital camera capable of appropriately performing color compensation reflecting the characteristic of the interchangeable lens on the image data.

To attain the above-mentioned object, a first aspect of the invention relates to a digital camera comprising an interchangeable lens and a camera body to which the interchangeable lens is attachable, wherein the interchangeable lens comprises a memory for storing color compensate information of the interchangeable lens, and the camera body comprises: an image sensor for photographing an object and generating image data; and a controller for associating the color compensate information with the image data.

Moreover, another aspect of the invention relates to an interchangeable lens attachable to a camera body of a digital camera and comprising: an image sensor for generating image data of an object; and a controller for associating color compensate information with the image data, wherein the color compensate information of the interchangeable lens is stored in the interchangeable lens itself.

Moreover, another aspect of the invention relates to a camera body to which an interchangeable lens in which color compensate information of the interchangeable lens is stored is attachable, the camera body comprising: an image sensor for photographing an object and generating image data; a memory for storing the color compensate information for each kind of interchangeable lens; a controller for associating the color compensate information with the image data; and a determination part for determining whether or not the color compensate information is stored in the interchangeable lens attached to the camera body, wherein the controller inhibits the association of the color compensate information with the image data when the color compensate information is not stored in the lens attached to the camera body and color compensate information corresponding to the kind of the lens is not stored in the memory.

Moreover, another aspect of the invention relates to a digital camera comprising an interchangeable lens and a camera body to which the interchangeable lens is attachable, wherein a memory is provided for storing color compensate information corresponding to a kind of a filter, the interchangeable lens comprises a detector for detecting the kind of the filter set in the interchangeable lens, and the camera body comprises: an image sensor for photographing an object and generating image data; and a controller for associating the color compensate information with the image data in accordance with the kind of the filter detected by the detector.

Moreover, another aspect of the invention relates to an image processing method using a digital camera comprising an interchangeable lens and a camera body to which the interchangeable lens is attachable, the image processing method comprising: detecting a kind of a filter set in the interchangeable lens; photographing an object and generating image data before or after the detecting; associating, with the image data, color compensate information corresponding to the detected kind of the filter; and performing image processing on the image data based on the associated color compensate information.

These and other objects, advantages and features of the invention will become apparent from the following description thereof taken in conjunction with the accompanying drawings, which illustrate specific embodiments of the invention.

BRIEF DESCRIPTION OF THE DRAWINGS

In the following description, like parts are designated by like reference numbers throughout the several drawings.

DETAILED DESCRIPTION OF THE PREFERRED EMBODIMENTS

First Embodiment

Structure of a Relevant Part of a Digital Camera

Figure 1:
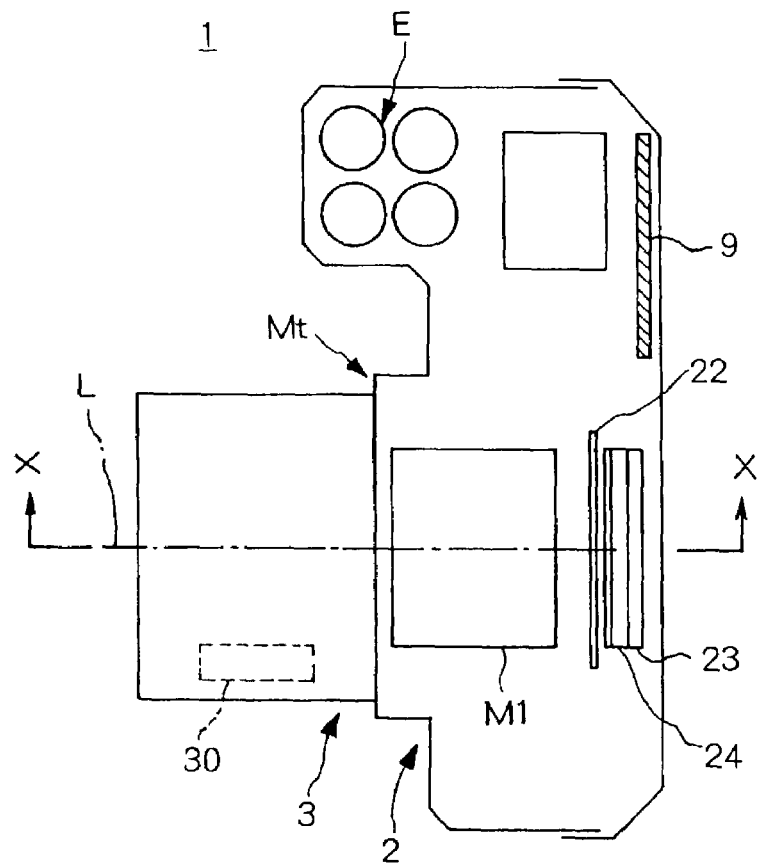
FIG. 1 is a view showing a first embodiment of the present invention and shows the structure of a relevant part of a digital camera.
Figure 2:
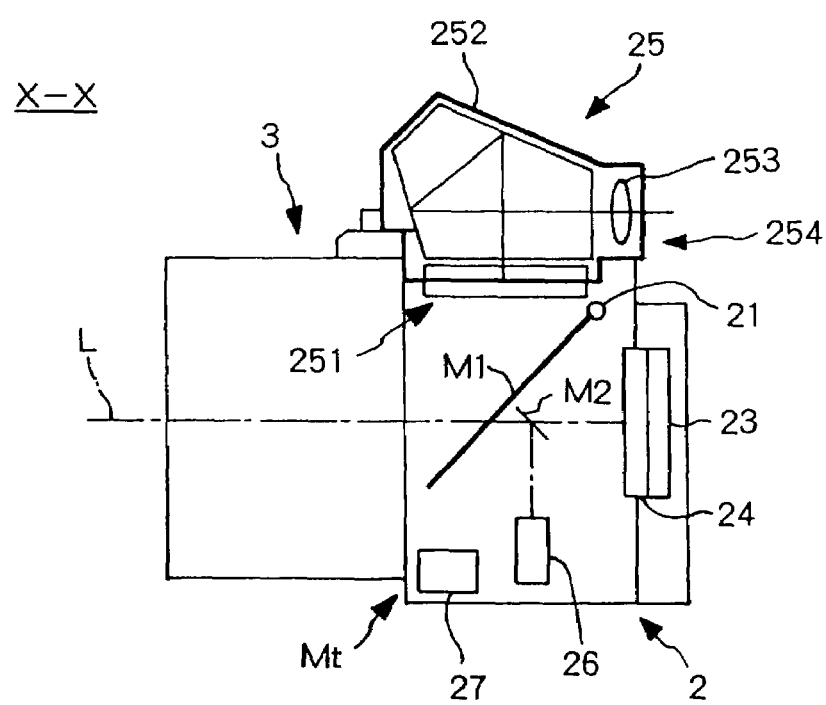
FIG. 2 shows the structure of the relevant part of the digital camera according to the first embodiment.
Figure 3:
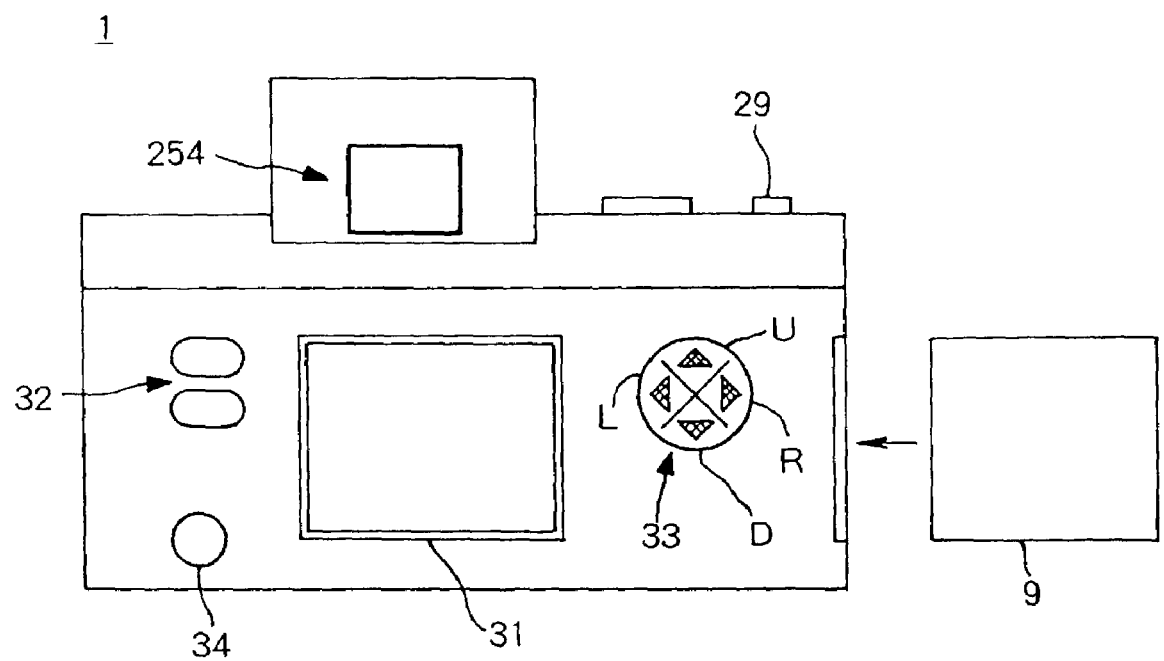
FIG. 3 shows the structure of the relevant part of the digital camera according to the first embodiment.

FIGS. 1 to 3 are views showing the structure of the relevant part of a digital camera 1 according to a first embodiment. FIG. 1 is a plan view. FIG. 2 is a cross-sectional view taken on the line X—X of FIG. 1. FIG. 3 is a rear view. These views do not always strictly adhere to the third angle projection method but are arranged as required so that the structure of the relevant part of the digital camera 1 is easily understood.

The digital camera 1 has a camera body 2 having a similar structure to that of a single lens reflex camera using film, and an interchangeable lens 3 attachable to a lens mount Mt of the camera body 2.

A quick return mirror M1 pivotably supported by a support 21 in an upper rear part in the camera body 2 is disposed in a position behind the interchangeable lens 3 and on the optical axis L. Further, a focal plane shutter 22 is disposed in a position behind the mirror M1 and on the optical axis L, and a CCD 23 serving as a color area sensor is disposed behind the focal plane shutter 22.

A spatial low pass filter 24 suppressing the influence of aliasing noise at the time of sampling of an analog image signal from the CCD 23 is disposed on the front surface of the CCD 23.

A viewfinder portion 25 is disposed in a position above the mirror M1 in the camera body 2. The view finder portion 25 is provided with a pentagonal roof prism 252 above a focusing screen 251. Further, an eyepiece 253 is disposed between the prism 252 and a finder window 254. The mirror M1, the prism 252 and the eyepiece 253 constitute an optical viewfinder.

In the digital camera 1, until a shutter start button 29 is fully depressed by the user, the mirror M1 is in a regular position inclined at 45 degrees to the optical axis L as shown in FIG. 2 so that the optical flux L from the interchangeable lens 3 is directed toward the focusing screen 251. When the start button 29 is fully depressed, the mirror M1 pivots upward on the support 21 to a substantially horizontal position so that the optical path from the interchangeable lens 3 to the CCD 23 is opened.

A sub-mirror M2 is pivotably supported on the back surface of the mirror M1, and reflects an optical flux transmitted by a semitransparent portion provided in a part of the mirror M1 so that it is directed toward a focus detecting sensor 26. The focus detecting sensor 26 detects the focus state of the interchangeable lens with respect to the object so that the lens units provided in the interchangeable lens 3 are automatically driven to the in-focus position. When the mirror M1 pivots upward, the sub-mirror M2 also pivots in response thereto so as to be parallel to the back surface of the mirror M1.

A focusing motor 27 for driving the focusing lens unit included in the interchangeable lens 3 along the optical axis L is provided in the camera body 2. Further, four batteries E supplying electric power to the digital camera 1 and a memory card 9 for recording obtained image data and the like are attachable to the camera body 2.

A liquid crystal display (LCD) 31 for displaying an image obtained based on the output of the CCD 23 and a selector switch 32 for selecting a "photographing mode", a "playback mode" or the like are provided on the back surface of the camera body 2. The photographing mode is for taking pictures or images, and the playback mode is for playing back taken images recorded on the memory card 9.

A four way key 33 is provided on the right side of the back surface of the digital camera 1, and various operations can be performed with the buttons U, D, L and R. A power switch 34 for turning on and off the digital camera 1 is provided on the back surface of the camera body 2.

The interchangeable lens 3 has a lens ROM 30 inside. In the lens ROM 30, an ICC (International Color Consortium) profile for color matching which is the color compensate information (parameter) of the interchangeable lens 3 is stored.

Figure 4:
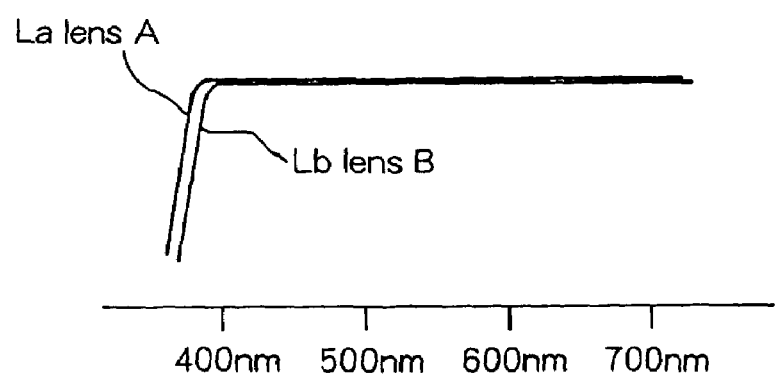
FIG. 4 is a view for explaining the spectral transmission characteristics of different kinds of interchangeable lenses.

As shown in FIG. 4, the spectral transmission characteristics La and Lb of interchangeable lenses different in kind and material are different from each other. In FIG. 4, the horizontal axis represents the wavelength, and the vertical axis represents the transmittance. In the digital camera 1, the color reproducibility of the image data is improved by storing the ICC profile particular to the interchangeable lens in the lens ROM 30.

Figure 5:
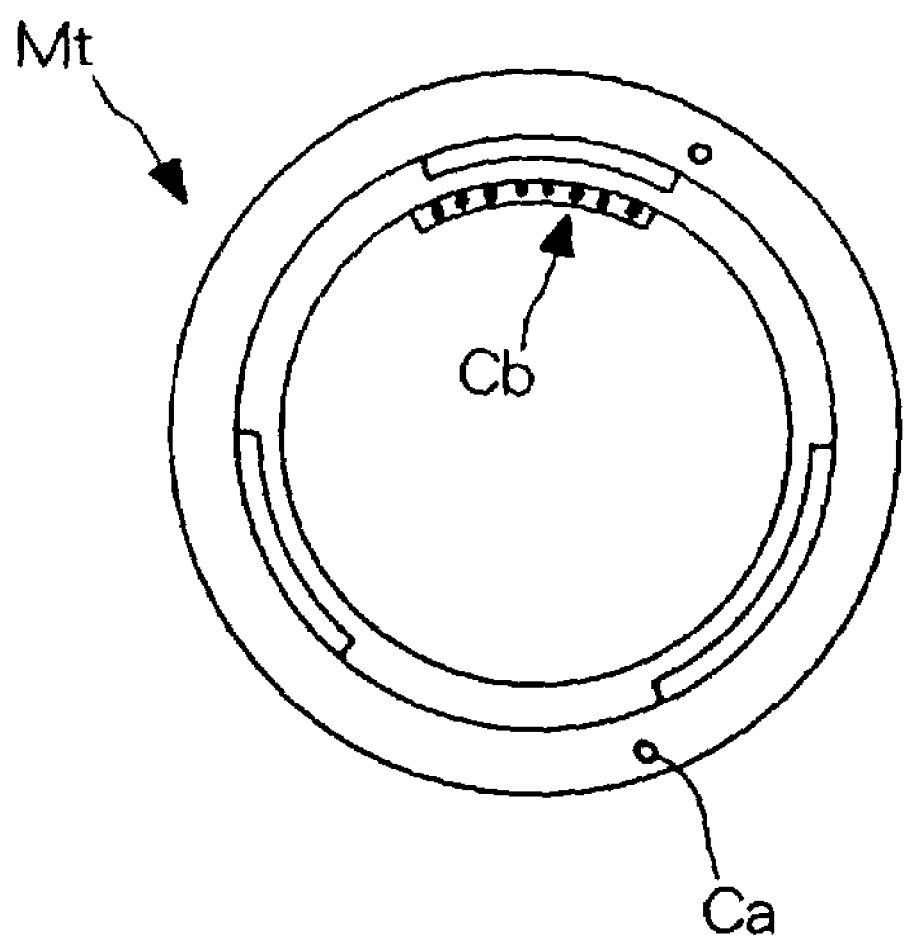
FIG. 5 is a view showing the structure of a relevant part of a lens mount.

FIG. 5 is a view showing the structure of a relevant part of the lens mount Mt.

The lens mount Mt to which the interchangeable lens 3 is attachable is provided with a lens driving shaft Ca and a connector Cb.

The lens driving shaft Ca is connected to the focusing motor 27, and transmits the driving force to move the lens unit in the interchangeable lens 3.

The connector Cb electrically connects the camera body 2 and the interchangeable lens 3, and this enables the ICC profile of the lens recorded in the lens ROM 30 to be transmitted to the camera body 2.

Functional Block of the Digital Camera 1

Figure 6:
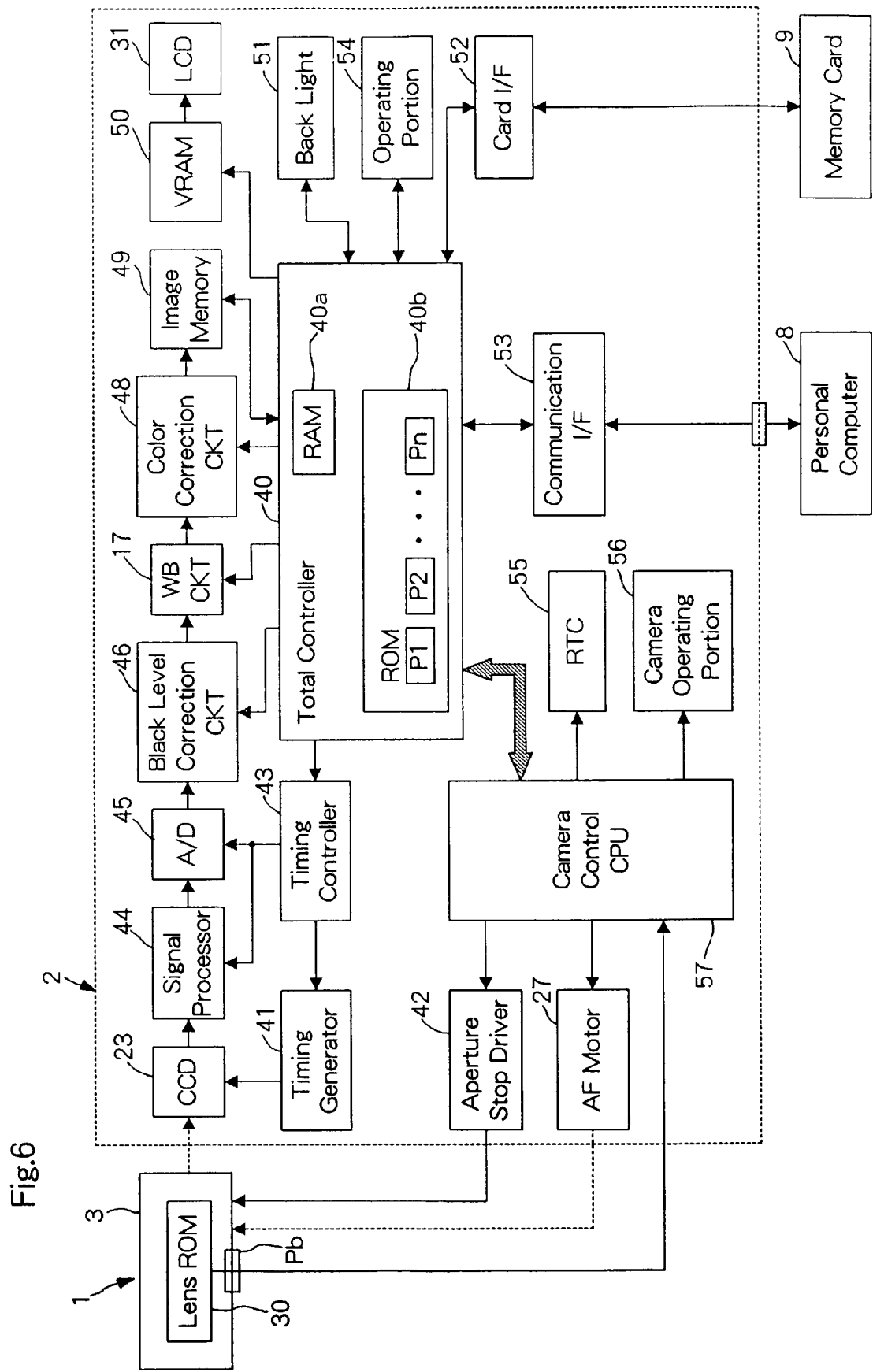
FIG. 6 is a functional block diagram of the digital camera.

FIG. 6 is a functional block diagram of the digital camera 1.

The CCD 23 photoelectrically converts the light image of the object formed by the interchangeable lens 3, and outputs an image signal of color components of R (red), G (green) and B (blue), that is, a signal comprising a string of pixel signals received at the pixels. That is, the CCD 23 generates image data of the object. A timing generator 41 generates various kinds of timing pulses for controlling the driving of the CCD 23.

The exposure control of the digital camera 1 is performed by adjusting by an aperture control driver 42 the aperture stop in the interchangeable lens 3 and the exposure amount of the CCD 23, that is, the charge accumulation time of the CCD 23 corresponding to the shutter speed.

The timing generator 41 generates driving control signals of the CCD 23 based on a reference clock transmitted from a timing controller 43. The timing generator 41 generates clock signals such as the accumulation start/end (exposure start/end) timing signal and signals (a horizontal synchronization signal, a vertical synchronizing signal, a transfer signal, etc.) to control the reading of the light reception signals of the pixels, and outputs the generated signals to the CCD 23.

A signal processor 44 performs predetermined analog processings on the analog image signals output from the CCD 23. The signal processor 44 having a CDS (correlation double sampling) circuit and an AGC (automatic gain control) circuit reduces the noise of the image signal by the CDS circuit and adjusts the level of the image signal by adjusting the gain of the AGC circuit.

An analog to digital (A/D) converter 45 converts the pixel signals of the image signal into 12-bit digital signals. The A/D converter 45 converts the analog pixel signals into 12-bit digital signals based on a clock for A/D conversion input from the timing controller 43.

The timing controller 43 generating clocks for the timing generator 41 and the A/D converter 45 is provided. The timing controller 43 is controlled by a reference clock in an overall controller 40.

A black level correction circuit 46 corrects the black levels of the A/D converted pixel signals to a reference black level. A white balance (WB) circuit 47 converts the levels of the pixel data of the color components of R, G and B. The WB circuit 47 converts the levels of the pixel data of the color components of R, G and B by use of a level conversion table input from the overall controller 40. The parameter of each color component of the level conversion table, that is, the characteristic inclination is automatically or manually set for each taken image by the overall controller 40.

A color compensation circuit 48 associates the ICC profile of the attached interchangeable lens 3 and the ICC profile for compensating for the color reproduction characteristic particular to the camera body 2 with image data obtained by the CCD 23. Color compensation of the image data can be performed based on the associated ICC profile. An image memory 49 is for storing the pixel data output from the color compensation circuit 48. A VRAM 50 is a buffer memory of the image data displayed on the LCD 31. A back light 51 supplies light to the LCD 31 from the rear.

In the playback mode of the digital camera 1, the image data read out from the memory card 9 undergoes predetermined signal processings at the overall controller 40, is transferred to the VRAM 50, and is then displayed on the LCD 31.

A card I/F 52 is an interface for performing writing/reading of image data onto/from the memory card 9. A communication I/F 53 is an interface for external connection enabling communication with a personal computer 8. The communication I/F 53 is in conformity with, for example, the USB standard. Control programs recorded on recording media such as the memory card 9 and CD-ROMs can be taken in a memory of the overall controller 40 through the card I/F 52 and the communication I/F 53.

An operation portion 54 includes the selector switch 32 and the four way key 33.

An RTC 55 is a clock circuit for managing the date and time of photographing, and is driven by a non-illustrated another power source.

A camera operation portion 56 includes the shutter start button 29, the power switch 34 and the like associated mainly with photographing of the digital camera 1.

The shutter start button 29 is a two-stroke switch where a half depressed condition (S1 on) and a fully depressed condition (S2 on) can be detected. When the shutter start button 29 is half depressed, that is, brought to the S1 on condition during standby, lens driving for automatic focusing is performed by the AF motor 27.

The overall controller 40 has a CPU and a memory (RAM 40a), and is organically connected to the above-described elements of the digital camera 1 to perform centralized control of the operation of the digital camera 1. The overall controller 40 also has a ROM 40b. In the ROM 40b are stored the ICC profile of the camera body 2 and the ICC profiles P1, P2, . . . and Pn of a number, "n", of kinds of interchangeable lenses with which photographing can be performed when they are attached to the camera body 2.

A camera control CPU 57 is connected to the overall controller 40 so that transmission is possible, and is mainly for processing the user's operation on the digital camera 1.

In the photographing mode, when a photographing instruction, that is, an exposure start instruction is provided by the shutter start button 29, the overall controller 40 generates (1) a thumbnail image and (2) a compressed image, compressed with a set compression ratio by the JPEG method, of the image taken in the image memory 49 upon the photographing instruction. Further, the overall controller 40 stores these images into the memory card 9 together with information such as tag information (the frame number, the exposure value, the shutter speed, the compression ratio, the date of photographing, data on on/off of the electronic flash at the time of photographing, scene information, the result of image determination, etc.) of the taken image.

Figure 7:
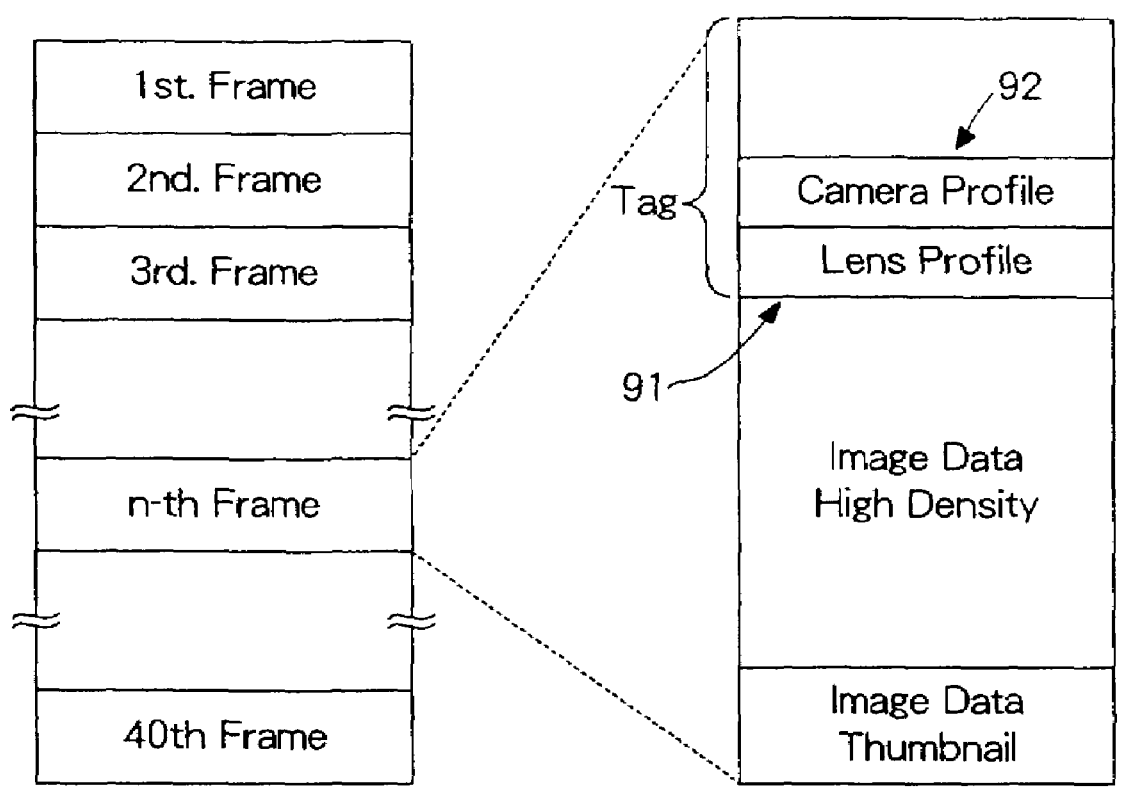
FIG. 7 is a view for explaining data storage of a memory card.

In the memory card 9, as shown in FIG. 7, compressed images of images recorded by the digital camera 1 can be stored, and in each frame, a part of tag information is provided and a JPEG-compressed high resolution image signal (1600×1200 pixels) and an image signal (80×60 pixels) for thumbnail display are recorded. In the part of tag information, a lens profile 91 of the interchangeable lens 3 and a camera profile 92 of the camera body 2 are stored so as to be associated with image data.

Figure 8:
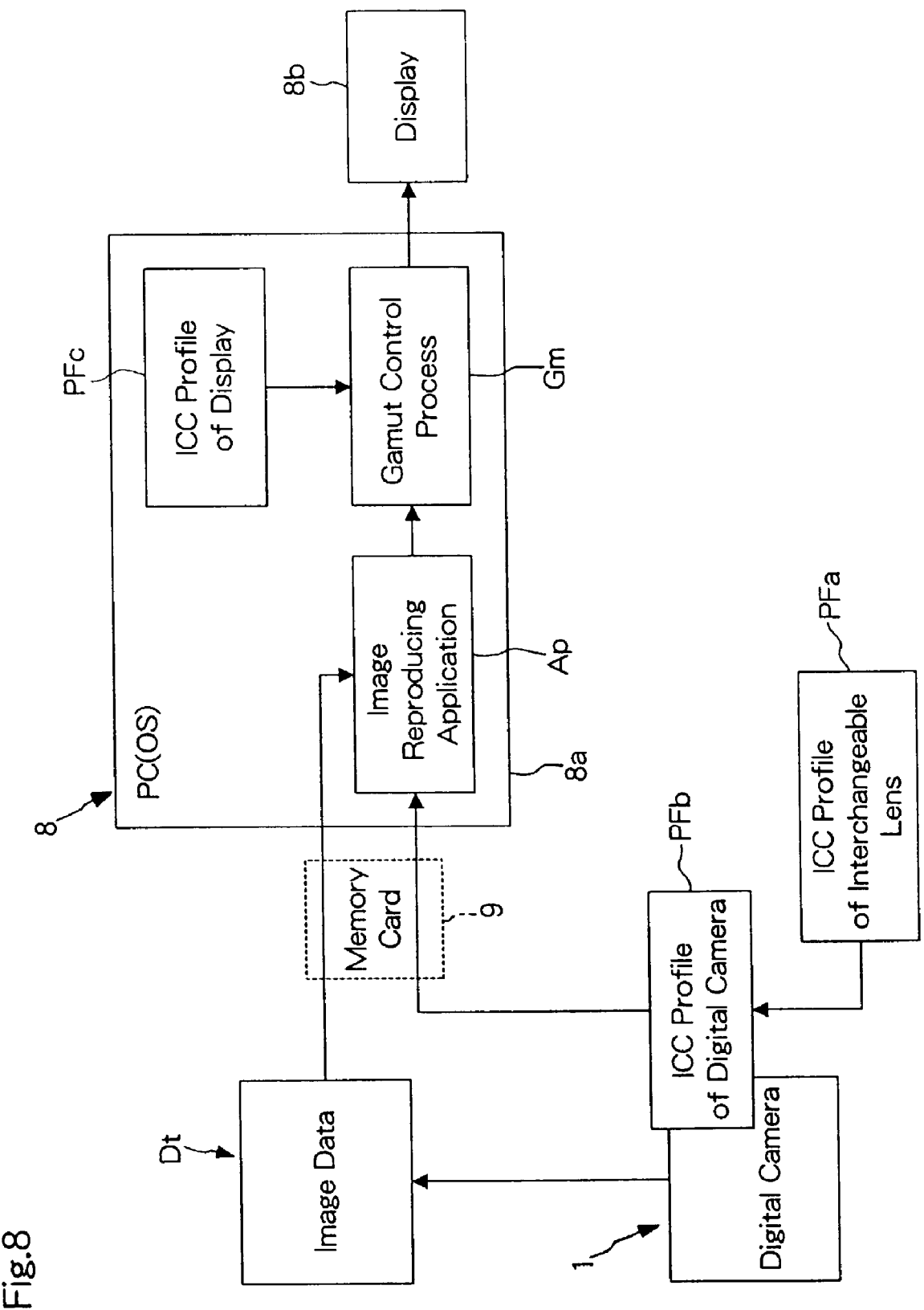
FIG. 8 is a view for explaining an example of use of profiles.

FIG. 8 is a view for explaining an example of use of the profiles.

The image data Dt obtained by the digital camera 1, the ICC profile PFa of the interchangeable lens 3 associated with the image data Dt and the ICC profile PFb of the camera body 2 are input to the personal computer 8, for example, through the memory card 9. Then, after color compensation reflecting the color compensate information of the ICC profiles PFa and PFb is performed on the image data Dt by an image display application Ap launched on a personal computer main unit 8a, the process shifts to a gamut adjustment processing Gm. In the gamut adjustment processing Gm, image processing reflecting the ICC profile PFc of a display 8b is performed, and an image having appropriate color reproducibility is displayed on the display 8b.

The use of the profile of the interchangeable lens 3 is not limited to the case where display is provided on the display 8b, but the profile may be used at the time of printing. Further, the use is not limited to the use on the personal computer 8, but the profile may be used for image display on the LCD 31 of the digital camera 1.

Operation of the Digital Camera 1

Figure 9:
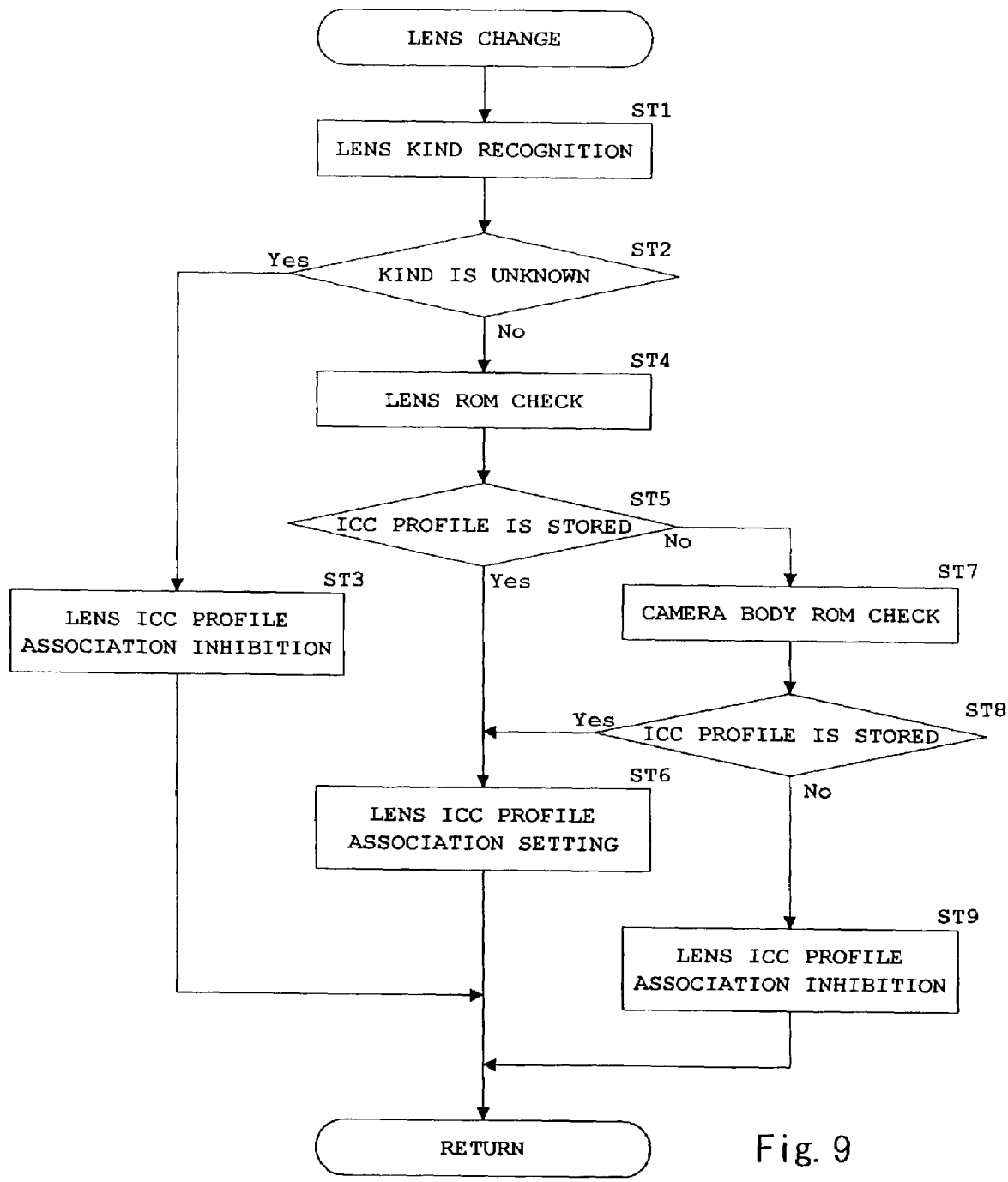
FIG. 9 is a flowchart for explaining an operation associated with a lens change in the digital camera.

FIG. 9 is a flowchart for explaining an operation associated with a lens change in the digital camera 1. This operation is automatically performed by the controller 40 when a lens change is detected.

At step ST1, the kind of the interchangeable lens 3 attached to the camera body 2 is recognized. At this step, the kind of the interchangeable lens 3 can be recognized by the camera body 2 obtaining through the connector Cb the information on the interchangeable lens stored in the lens ROM 30 of the interchangeable lens 3.

At step ST2, whether the kind of the interchangeable lens 3 is unknown or not is determined based on the operation at step ST1. At this step, the kind of the interchangeable lens 3 is determined to be unknown when the lens ROM 30 is absent in the interchangeable lens 3 or when the camera body 2 cannot recognize the kind of the interchangeable lens 3 although the lens ROM 30 is present. When the kind of the interchangeable lens 3 is unknown, the process proceeds to step ST3. When the kind is not unknown, the process proceeds to step ST4.

At step ST3, association of the ICC profile of the lens with the image data obtained by the digital camera 1 is inhibited. That is, when photographing is performed with the currently attached interchangeable lens, the color compensate information of the lens is not associated with the image data. This is because an effective ICC profile cannot be associated with the image data since the kind of the interchangeable lens 3 is unknown.

At step ST4, it is checked whether an ICC profile of a lens is present in the lens ROM 30 of the interchangeable lens 3 or not.

At step ST5, it is determined whether the ICC profile of the interchangeable lens 3 is stored in the lens ROM 30 or not. When the profile is present, the process proceeds to step ST6. When the profile is absent, the process proceeds to step ST7.

At step ST6, setting is made to associate the lens ICC profile corresponding to the kind of the attached interchangeable lens with the image data obtained by the digital camera 1. Specifically, the ICC profile in the lens ROM 30 or the ICC profile in the ROM 40b in the camera body 2 is loaded into the RAM 40a in the camera body 2, and when the obtained image data is recorded, the lens profile 91 (FIG. 7) associated with the image data is recorded.

At step ST7, the ROM 40b of the overall controller 40 in the camera body 2 is checked.

At step ST8, it is determined whether the ICC profile of the currently attached interchangeable lens is stored in the ROM 40b in the camera body 2 or not. When the ICC profile is stored, the process proceeds to step ST6. When it is not stored, the process proceeds to step ST9.

At step ST9, like at step ST3, association of the ICC profile of the lens with the image data obtained by the digital camera 1 is inhibited. That is, when no ICC profile is stored in the interchangeable lens 3 attached to the camera body 2 and the ICC profile corresponding to the kind of the interchangeable lens is not stored in the ROM 40a of the camera body 2, association of color compensate information with image data is inhibited.

By the above-described operation of the digital camera 1, for interchangeable lenses existing at the time of shipment of the camera body 2, that is, interchangeable lenses of which ICC profiles are not stored in the interchangeable lenses, appropriate color compensation in accordance with the characteristic of the interchangeable lens can be performed with the ICC profile in the camera body 2, and for interchangeable lenses newly provided after the shipment of the camera body 2, appropriate color compensation can be performed with the ICC profile in the interchangeable lens. That is, color compensation reflecting the characteristic of the interchangeable lens can be appropriately performed for all kinds of interchangeable lenses.

In image processing in digital cameras and the like, it is desirable to perform image compensation using an ICC profile for color matching after performing white balance compensation on the image data. By doing this, color reproduction faithful to the object can be performed.

Second Embodiment

Structure of a Relevant Part of a Digital Camera

The structure of a digital camera 1A according to a second embodiment is similar to that of the digital camera 1 according to the first embodiment, but the structure of an interchangeable lens 3A is different. In the interchangeable lens 3A, a filter can be set.

Figure 10:
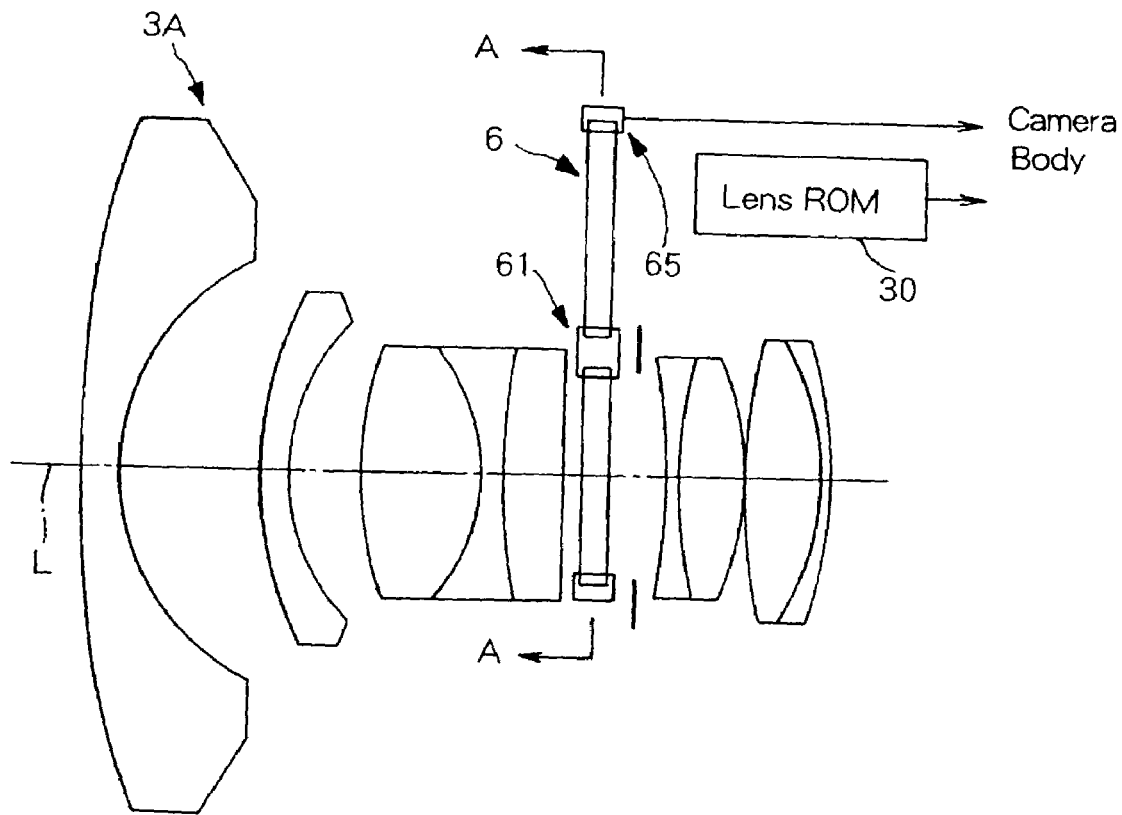
FIG. 10 is a view showing a second embodiment of the present invention and shows a cross section of an interchangeable lens.
Figure 11:
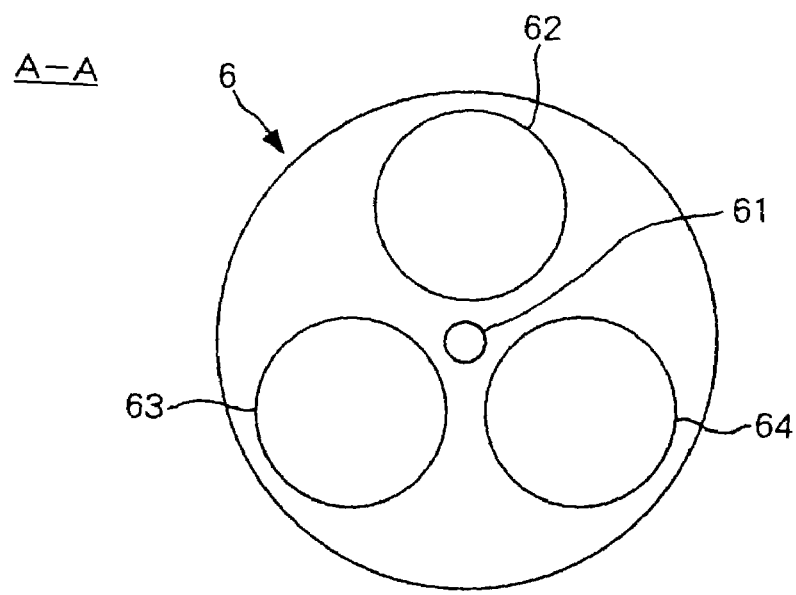
FIG. 11 is a cross-sectional view taken on the line A—A of FIG. 10.

FIG. 10 is a view showing a cross section of the interchangeable lens 3A with respect to the direction of the optical axis L. FIG. 11 is a cross-sectional view taken on the line A—A of FIG. 10.

A filter portion 6 is interposed between lens units in the interchangeable lens 3A, and is rotatable on a rotation axis 61.

In the filter portion 6, three circular filters 62 to 64 are disposed, and by rotating the filter portion 6, one of the three filters 62 to 64 can be situated on the optical axis L. The filter situated on the optical axis L enables a photographing intended by the user.

Moreover, identification information for identifying the kind of the filter set on the optical axis is provided by a detector 65 provided in the interchangeable lens 3A and detecting the rotation condition of the filter portion 6. By the filter identification information being transmitted to the camera body 2, the camera body 2 can detect the kind of the selected filter.

The filter 62 is an ultraviolet (UV) filter that cuts light in the ultraviolet region, and has a spectral transmission characteristic being flat in the visible region as shown in FIG. 4, that is, with no bias in color. Another example of the filter having a spectral transmission characteristic with no bias in color is a neutral density (ND) filter.

The filter 63 is a 4 deca-mired color temperature conversion filter (LBB4) functioning as a compensation filter, and is selected by the user in consideration of the light source temperature with respect to the object.

Figure 12:
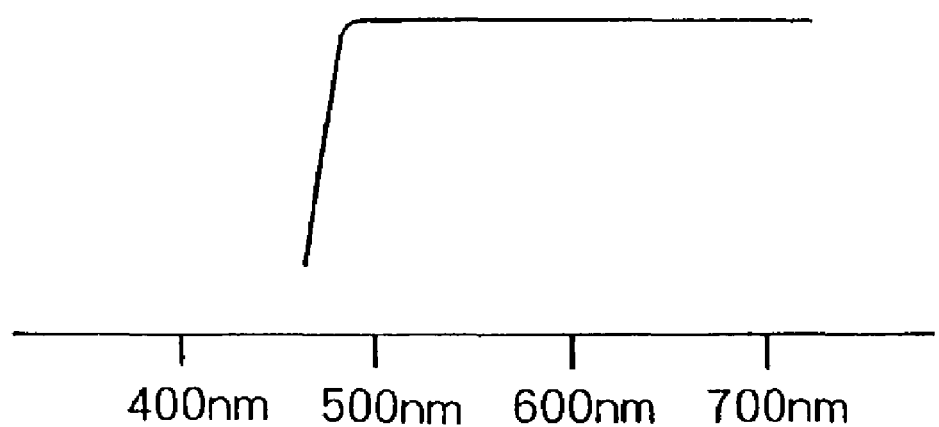
FIG. 12 is a view for explaining the spectral transmission characteristic of a yellow filter.

The filter 64 is a yellow Y2 filter, and has a spectral transmission characteristic absorbing light of wavelengths not more than approximately 480 nm as shown in FIG. 12, that is, with a bias in color in the visible region.

Moreover, in the lens ROM 40a of the interchangeable lens 3A, a plurality of ICC profiles of a plurality of kinds of filters that can be set in the interchangeable lens 3A is stored.

Operation of the Digital Camera 1A

The operation of the digital camera 1A of the second embodiment is similar to that of the digital camera 1 of the first embodiment, but is different in the operation at step ST6 shown in the flowchart of FIG. 9. That is, the digital camera 1A performs an operation associated with a filter change described below instead of the operation at step ST6. This operation is performed by the controller 40 when the detector 65 detects a filter selection condition change.

Figure 13:
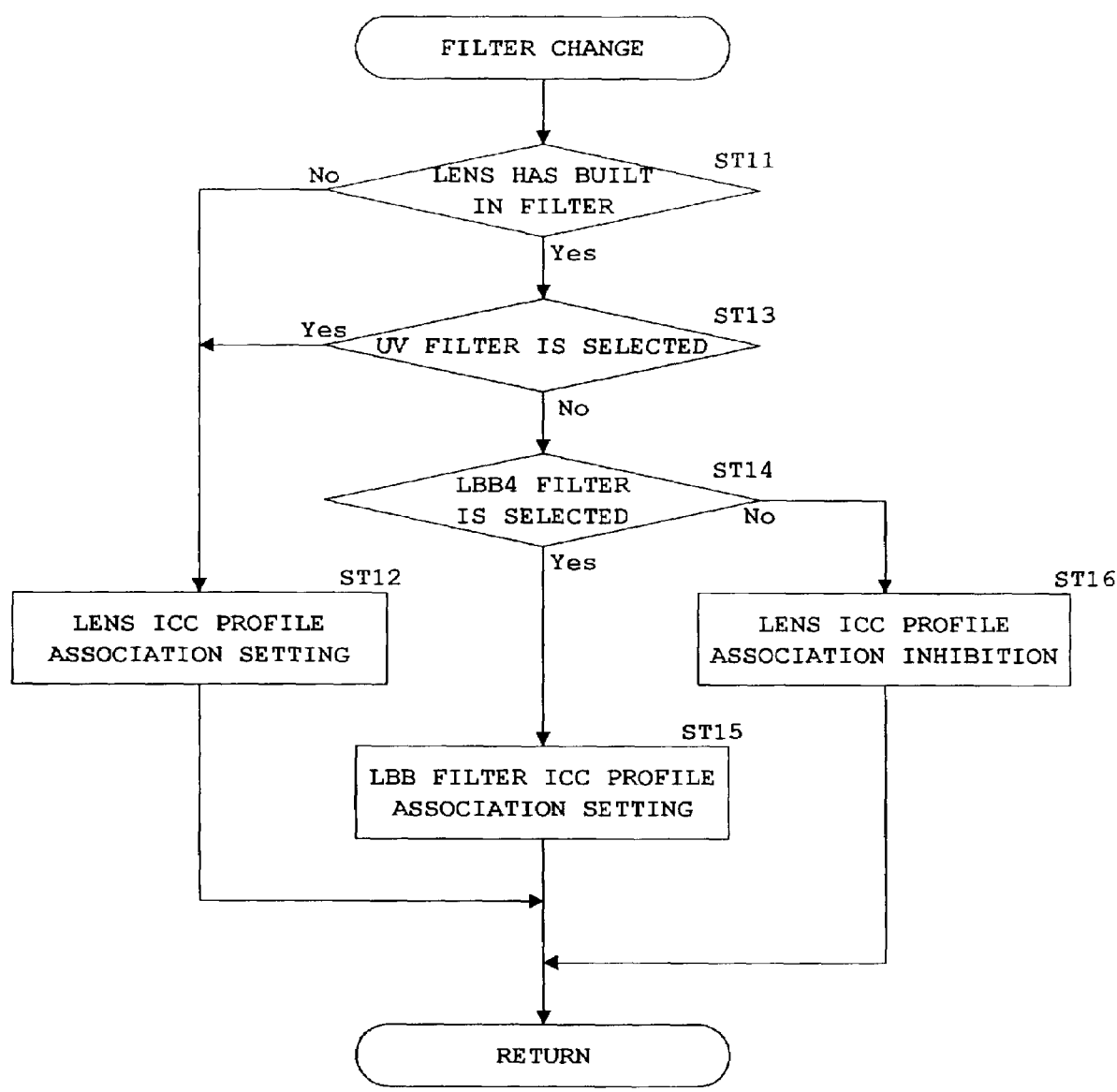
FIG. 13 is a flowchart showing an operation associated with a filter change in the digital camera.

FIG. 13 is a flowchart showing the operation associated with a filter change in the digital camera 1A.

At step ST11, it is determined whether the interchangeable lens has a built-in filter or not. This determination is made, for example, based on the information stored in the lens ROM 30 of the interchangeable lens 3A. When the interchangeable lens has a built-in filter, the process proceeds to step ST12. When it has no built-in filter, the process proceeds to step ST13.

At step ST12, setting is made to associate the ICC profile of the lens with the image data obtained by the digital camera 1A. Specifically, after the ICC profile of the interchangeable lens 3A is loaded into the RAM 40a in the camera body 2, when the obtained image data is recorded, the lens profile 91 (FIG. 7) associated with the image data is recorded.

At step ST13, whether the user selects the UV filter 62 or not is determined based on the filter identification information provided by the detector 65. That is, different color compensate information is associated with the image data according to whether the filter set in the interchangeable lens 3A has a spectral transmission characteristic with no bias in color or not. When the UV filter 62 is selected, the process proceeds to step ST12. When it is not selected, the process proceeds to step ST14.

At step ST14, whether the user selects the LBB4 filter 63 or not is determined based on the filter identification information provided by the detector 65. When the LBB4 filter 63 is selected, the process proceeds to step ST15. When it is not selected, the process proceeds to step ST16.

At step ST15, setting is made to associate, with the image data obtained by the digital camera 1A, the profile for the LBB filter, that is, the color compensate information corresponding to the kind of the filter. Specifically, the ICC profile where the characteristic of the LBB4 filter is added to the lens characteristic is loaded from the lens ROM 30 into the RAM 40a in the camera body 2, and when the obtained image data is recorded, the lens profile 91 (FIG. 7) associated with the image data is recorded.

At step ST16, association of the ICC profile with the image data obtained by the digital camera 1A is inhibited. Since the yellow filter 64 which is a color filter is selected, the user's intension to photograph a yellowish image is respected and association of the ICC profile is not performed.

Since an ICC profile can be appropriately set for each filter by the above-described operation of the digital camera 1A, color compensation reflecting the filter characteristic of the interchangeable lens can be appropriately performed on the image data.

Modifications

In the interchangeable lens 3A of the second embodiment, it is not essential that selection can be made among three filters, but the interchangeable lens 3A may be one in which one filter is built-in or one to which a filter is attachable.

Further, while in the first and the second embodiments, the ICC profile of the interchangeable lens and the obtained image data are recorded being associated with each other, obtained image data on which color compensation processing associated with the ICC profile of the interchangeable lens has been performed by the color compensation circuit 48 may be recorded without the ICC profile of the interchangeable lens itself being recorded.

With respect to the color compensation, the use of the ICC profile is not essential, but another data format may be used.

The above-described concrete embodiments include a structure having the following constitutions:

(1) A digital camera wherein the color compensate information is a profile for color matching.

This enables color reproduction faithful to the object to be appropriately performed.

(2) A digital camera according to (1), wherein in the image processing, after white balance compensation on the image data is performed, image compensation using the profile for color matching is performed.

This enables color reproduction faithful to the object to be more appropriately performed.

According to the above-described constitutions, color compensate information of the interchangeable lens is stored in the interchangeable lens, and the color compensate information is associated with the image data of the object. Consequently, for any interchangeable lens, color compensation reflecting the characteristic of the interchangeable lens can be appropriately performed on the image data. That is, it is unnecessary to be conscious of the color reproduction characteristic that varies among interchangeable lenses, so that color matching is facilitated.

When color compensate information is stored in the interchangeable lens attached to the camera body, the color compensate information is associated with the image data, and when color compensate information is not stored in the interchangeable lens attached to the camera body, color compensate information corresponding to the kind of the attached interchangeable lens is associated with the image data by use of the color compensate information stored in the memory of the camera body. Consequently, for interchangeable lenses existing at the time of shipment of the camera body, appropriate color compensation in accordance with the characteristic of the interchangeable lens can be performed with the color compensate information in the camera body, and for interchangeable lenses newly provided after the shipment of the camera body, appropriate color compensation can be performed with the color compensate information in the interchangeable lens.

Moreover, by providing the memory for storing the color compensate information of the interchangeable lens in the interchangeable lens itself and associating the color compensate information with the image data in the camera body of the digital camera, it is unnecessary to be conscious of the color reproduction characteristic that varies among interchangeable lenses, so that color compensation reflecting the characteristic of the interchangeable lens can be appropriately performed on the image data.

Moreover, by storing a plurality of pieces of color compensate information of a plurality of kinds of filters among which selection can be made in the interchangeable lens, color compensation reflecting the characteristics of a plurality of kinds of filters can be appropriately performed.

Moreover, when the color compensate information is not stored in the lens attached to the camera body and the color compensate information corresponding to the kind of the lens is not stored in the memory, association of the color compensate information with the image data is inhibited. Consequently, at the time of photographing for special effect using an unspecified lens or the like, erroneous color compensation is never performed.

Moreover, the kind of the filter set in the interchangeable lens is detected, and the color compensate information is associated with the image data in the camera body in accordance with the detected kind of the filter. Consequently, color compensation reflecting the characteristic of the filter set in the interchangeable lens can be appropriately performed on the image data.

Moreover, by determining whether or not different color compensate information is associated with the image data according to whether or not the filter set in the interchangeable lens has a spectral transmission characteristic with no bias in color, image processing reflecting the user's intention can be performed.

Moreover, when the filter set in the interchangeable lens is a color filter, by inhibiting association of the color compensate information with the image data, image processing reflecting the user's intention can be performed.

Moreover, when the filter set in the interchangeable lens is a color temperature compensation filter, by associating the color compensate information corresponding to the kind of the set filter with the image data, image processing reflecting the user's intention can be performed.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A camera body to which an interchangeable lens in which color compensate information of the interchangeable lens is stored is attachable, the camera body comprising:
   (a) an image sensor for generating image data of an object,
   (b) a controller for associating the color compensate information with the image data,
   (c) a memory for storing the color compensate information for each kind of interchangeable lens, and
   (d) a determination part for determining whether or not the color compensate information is stored in the interchangeable lens attached to the camera body,
   wherein the controller associates the color compensate information stored in the interchangeable lens with the image data so as to record the image data together with the color compensate information,
   and wherein the controller further associates the color compensate information stored in the interchangeable lens with the image data when the color compensate information is stored in the interchangeable lens attached to the camera body, and associates, with the image data, color compensate information stored in the memory and corresponding to the kind of the attached interchangeable lens when the color compensate information is not stored in the interchangeable lens attached to the camera body.

2. A camera body to which an interchangeable lens in which color compensate information of the interchangeable lens is stored is attachable, the camera body comprising:
   (a) an image sensor for generating image data of an object,
   (b) a controller for associating the color compensate information with the image data,
   (c) a memory for storing the color compensate information for each kind of interchangeable lens, and
   (d) a determination part for determining whether or not the color compensate information is stored in the interchangeable lens attached to the camera body,
   wherein the controller associates the color compensate information stored in the interchangeable lens with the image data so as to record the image data together with the color compensate information,
   and wherein the controller further associates the color compensate information stored in the interchangeable lens with the image data when the color compensate information is stored in the interchangeable lens attached to the camera body, and associates, with the image data, color compensate information stored in the memory and corresponding to the kind of the attached interchangeable lens when the color compensate information is not stored in the interchangeable lens attached to the camera body, and
   wherein the controller inhibits the association of the color compensate information with the image data when the color compensate information is not stored in the lens attached to the camera body and color compensate information corresponding to the kind of the lens is not stored in the memory.

3. An interchangeable lens attachable to a camera body of a digital camera, said camera body comprising an image sensor for generating image data of an object and a controller for associating color compensate information with the image data, wherein said interchangeable lens is characterized in that,
   the color compensate information of the interchangeable lens is stored in the interchangeable lens itself,
   further comprising a memory for storing a plurality of color compensate information of a plurality of kinds of filters among which selection can be made in the interchangeable lens.

4. A camera body to which an interchangeable lens is attachable, the interchangeable lens comprises a detector for detecting kind of a filter set in the interchangeable lens, said camera body comprising:
   an image sensor for generating image data of an object; and
   a controller for associating the color compensate information with the image data in accordance with the kind of the filter detected by the detector.

5. A camera body according to claim 4, wherein the controller determines whether or not different color compensate information is associated with the image data according to whether or not the filter set in the interchangeable lens has a spectral transmission characteristic with no bias in color.

6. A camera body according to claim 4, wherein the controller inhibits the association of the color compensate information with the image data when the filter set in the interchangeable lens is a color filter.

7. A camera body according to claim 4, wherein the controller associates color compensate information corresponding to the kind of the set filter with the image data when the filter set in the interchangeable lens is a color temperature compensation filter.

* * * * *